US012576294B2

(12) United States Patent
Li et al.

(10) Patent No.: US 12,576,294 B2
(45) Date of Patent: Mar. 17, 2026

(54) BATTERY SAFETY MONITORING SYSTEM AND METHOD, AND ENERGY STORAGE SYSTEM

(71) Applicant: Huawei Digital Power Technologies Co., Ltd., Shenzhen (CN)

(72) Inventors: Zhirun Li, Shenzhen (CN); Jing Zhu, Dongguan (CN); Tianhong Hou, Dongguan (CN); Junliang Lu, Dongguan (CN); Haonan Le, Osaka (JP); Bao Zhang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 18/356,412

(22) Filed: Jul. 21, 2023

(65) Prior Publication Data

US 2024/0024716 A1      Jan. 25, 2024

(30) Foreign Application Priority Data

Jul. 22, 2022    (CN) .......................... 202210867920.8

(51) Int. Cl.
*A62C 3/16*          (2006.01)
*A62C 2/24*          (2006.01)
(Continued)

(52) U.S. Cl.
CPC ............... *A62C 3/16* (2013.01); *A62C 2/247* (2013.01); *G08B 17/10* (2013.01); *H01M 10/48* (2013.01)

(58) Field of Classification Search
CPC .......... A62C 3/16; A62C 2/247; G08B 17/10; H01M 10/48
(Continued)

(56) References Cited

U.S. PATENT DOCUMENTS

| 4,785,289 A | * | 11/1988 | Chen | .................... | G08B 19/005 |
| | | | | | 340/309.8 |
| 6,504,155 B1 | * | 1/2003 | Ookawa | ................. | H04N 23/20 |
| | | | | | 250/370.15 |

(Continued)

FOREIGN PATENT DOCUMENTS

| CN | 105469533 A | * | 4/2016 | ........... | G08B 19/005 |
| CN | 109331376 A | * | 2/2019 | ............. | A62C 27/00 |

(Continued)

*Primary Examiner* — Kam Wan Ma
(74) *Attorney, Agent, or Firm* — Maier & Maier, PLLC

(57)                ABSTRACT
A battery safety monitoring system includes a central controller, a fault detection sensor, a flame detection apparatus, and a fire extinguishing apparatus. The fault detection sensor is configured to detect a fault in a target battery module and send fault information to the central controller. The central controller is configured to control the flame detection apparatus to perform flame detection on the target battery module based on the fault information. The flame detection apparatus is configured to send, when detecting a fire in the target battery module, fire information to the central controller. The central controller is further configured to control the fire extinguishing apparatus to start a fire extinguishing operation for the target battery module. There is no need to deploy excessive sensors. Instead, the flame detection apparatus is controlled to perform flame monitoring on the target battery module, to implement low-cost and accurate battery safety monitoring.

20 Claims, 4 Drawing Sheets

(51) Int. Cl.
  *G08B 17/10* (2006.01)
  *H01M 10/48* (2006.01)

(58) Field of Classification Search
  USPC ........................................................ 340/577
  See application file for complete search history.

(56) References Cited

U.S. PATENT DOCUMENTS

| | | | | |
|---|---|---|---|---|
| 8,833,477 | B2 * | 9/2014 | Kang ..................... | A62C 13/76 |
| | | | | 169/30 |
| 2017/0291050 | A1 * | 10/2017 | Boyle ..................... | A62C 2/06 |
| 2023/0310912 | A1 | 10/2023 | Yu et al. | |
| 2023/0361368 | A1 * | 11/2023 | Wang .................. | H01M 50/284 |

FOREIGN PATENT DOCUMENTS

| | | | |
|---|---|---|---|
| CN | 109893802 | A | 6/2019 |
| CN | 210521585 | U | 5/2020 |
| CN | 111710120 | A | 9/2020 |
| CN | 213642915 | U | 7/2021 |
| CN | 215003949 | U | 12/2021 |
| CN | 215182335 | U | 12/2021 |
| CN | 113920417 | A | 1/2022 |
| CN | 113947861 | A | 1/2022 |

* cited by examiner

Detect a fault in a target battery module and report fault information — S301

Perform flame monitoring on the target battery module based on the fault information — S302

When a fire is detected in the target battery module, start a fire extinguishing operation for the target battery module — S303

BATTERY SAFETY MONITORING SYSTEM AND METHOD, AND ENERGY STORAGE SYSTEM

CROSS-REFERENCE TO RELATED APPLICATIONS

This application claims priority to Chinese Patent Application No. 202210867920.8, filed on Jul. 22, 2022, the disclosure of which is hereby incorporated by reference in its entirety.

TECHNICAL FIELD

The embodiments relate to the field of energy storage technologies and to a battery safety monitoring system and method, and an energy storage system.

BACKGROUND

A lithium-ion battery is a secondary battery with high energy density and is widely used for energy storage in the energy storage industry. However, due to its high discharge power and flammable electrolyte, there are many safety risks, including battery thermal abuse and thermal runaway. Therefore, open fire detection needs to be performed on an energy storage battery container in real time. Currently, an existing method is to detect open fire by configuring an infrared/ultraviolet flame sensor, or detect open fire with solutions of video surveillance and deep learning. However, both solutions have specific defects. For the former, because the energy storage container has a narrow space and there are many obstacles, a plurality of sensors need to be configured for detection. In addition, electric arcs or the like may cause false alarms. This method is generally applicable to open fire detection in open areas. Because the cost of the energy storage container is high, and sensors are densely deployed in the energy storage container, it is difficult to maintain the container when the sensors are faulty. For the latter, fire in the energy storage container is usually caused by battery thermal runaway. As a result, smoke goes high before there is open fire, and the risk of failing to report is high.

It is understood that the existing open fire detection solutions are mainly applicable to fire extinguishing in spacious areas and buildings, but cannot adapt to a special environment of the energy storage container and a specific feature of battery fire, and there are problems such as high costs and high possibility of missed detection. Therefore, a low-cost and accurate solution for battery safety monitoring is urgently needed.

SUMMARY

The embodiments provide a battery safety monitoring system and method, and an energy storage system, to monitor battery safety accurately and at a low cost.

According to a first aspect, a battery safety monitoring system is provided. The battery safety monitoring system is used for safety monitoring of one or more battery modules. The battery safety monitoring system includes a central controller, a fault detection sensor, a flame detection apparatus, and a fire extinguishing apparatus. The fault detection sensor is configured to detect a fault in a target battery module and send fault information to the central controller. The central controller is configured to control the flame detection apparatus to perform flame detection on the target battery module based on the fault information. The flame detection apparatus is configured to send, when detecting a fire in the target battery module, fire information to the central controller. The central controller is further configured to control the fire extinguishing apparatus to start a fire extinguishing operation for the target battery module.

In this aspect, there is no need to deploy excessive sensors. Instead, the flame detection apparatus is controlled to perform flame monitoring on the target battery module when a fault is detected in the target battery module, to implement low-cost and accurate battery safety monitoring.

In a possible implementation, the fault detection sensor is configured to detect one or more of the following faults occurring in a cell of a battery in the target battery module: a cell temperature higher than a set temperature, a cell temperature rising speed higher than a set speed, a cell voltage lower than a set voltage, or a difference between a voltage of a cell of a first battery in a plurality of batteries included in the target battery module and a voltage of a cell of any one of the batteries, other than the first battery, in the target battery module greater than a set threshold.

In this implementation, whether a fault occurs in the battery module may be detected by detecting fault information such as overtemperature, an excessive temperature rise of the cell, a voltage drop, voltage outlier, or the like. The foregoing fault information may be detected or collected by a battery management system (BMS).

In another possible implementation, the fault detection sensor is configured to detect that a flammable gas concentration around the target battery module is greater than or equal to a set concentration.

In this implementation, when one or more batteries in the target battery module are faulty, a valve of a cell of one or more batteries in the target battery module may be opened, and a small amount of flammable gas is generated. When the flammable gas reaches a certain concentration, a fire may occur. Therefore, whether a fault is detected in the target battery module may be determined by detecting whether the flammable gas concentration of the target battery module is greater than or equal to the set concentration.

In still another possible implementation, the flame detection apparatus includes a flame detection sensor, a drive motor, and a posture adjustment base. The flame detection sensor is located on the posture adjustment base, and the drive motor is connected to the flame detection sensor and the posture adjustment base. The central controller is further configured to send position information of the target battery module to the drive motor. The drive motor is configured to drive to adjust a flame monitoring angle of the posture adjustment base, so that the angle is consistent with a position of the target battery module. The flame detection sensor is configured to continuously perform flame monitoring on the target battery module.

In this implementation, the flame monitoring angle of the posture adjustment base of the flame detection apparatus is adjusted, so that the angle is consistent with the position of the target battery module, so that flame monitoring can be accurately performed on the target battery module. In addition, there is no need to deploy excessive flame detection sensors to perform flame monitoring, which reduces monitoring costs.

In still another possible implementation, the drive motor is further configured to periodically drive to adjust the flame monitoring angle of the posture adjustment base; and the flame detection sensor is further configured to perform flame monitoring on the one or more battery modules.

In this implementation, when no fault is detected in any battery module, fire preventive maintenance inspection may be performed on one or more battery modules in a space, so as to discover a fire in a timely manner.

In still another possible implementation, the central controller is further configured to start a timer after receiving the fault information of the target battery module. The central controller is further configured to control, within timing duration of the timer, the flame detection apparatus to perform flame detection on the target battery module. The central controller is further configured to: receive, within the timing duration of the timer, the fire information sent by the flame detection apparatus, and control the fire extinguishing apparatus to start the fire extinguishing operation for the target battery module.

In this implementation, the timer is set to continuously monitor, within specific duration, whether a fire occurs in the faulty target battery module, so that safety of the target battery module can be accurately and reliably monitored.

In still another possible implementation, the central controller is further configured to: if the fire information sent by the flame detection apparatus is not received within the timing duration of the timer, and the central controller receives the fault information of the target battery module again, control the flame detection apparatus to continue to perform flame monitoring on the target battery module.

In this implementation, the timer is set to continuously monitor, within specific duration, whether a fire occurs in the faulty target battery module, so that safety of the target battery module can be accurately and reliably monitored.

In still another possible implementation, the central controller is further configured to power off a power loop including the target battery module.

In this implementation, after a fault is detected in the target battery module, the power loop including the target battery module is powered off in a timely manner, to avoid a fire in the power loop, and prevent a component from being burned down, which causes a greater loss.

According to a second aspect, a battery safety monitoring method is provided. The method includes: detecting a fault in a target battery module and reporting fault information; performing flame monitoring on the target battery module based on the fault information; and detecting a fire in the target battery module, starting a fire extinguishing operation for the target battery module.

In a possible implementation, detecting a fault in a target battery module includes detecting one or more of the following faults occurring in a cell of a battery in the target battery module: a cell temperature higher than a set temperature, a cell temperature rising speed higher than a set speed, a cell voltage lower than a set voltage, or a difference between a voltage of a cell of a first battery in a plurality of batteries included in the target battery module and a voltage of a cell of any one of the batteries, other than the first battery, in the target battery module greater than a set threshold.

In another possible implementation, detecting a fault in a target battery module includes detecting that a flammable gas concentration around the target battery module is greater than or equal to a set concentration.

In still another possible implementation, performing flame monitoring on the target battery module includes: adjusting a flame monitoring angle, so that the angle is consistent with a position of the target battery module; and continuously performing flame monitoring on the target battery module.

In still another possible implementation, before detecting a fault in a target battery module, the method further includes: periodically adjusting the flame monitoring angle; and performing flame monitoring on the one or more battery modules.

In still another possible implementation, continuously performing flame monitoring on the target battery module includes: when a fault is detected in the target battery module, starting a timer; and performing, within timing duration of the timer, flame detection on the target battery module. The starting of a fire extinguishing operation for the target battery module includes: when a fire is detected in the target battery module within the timing duration of the timer, starting a fire extinguishing operation for the target battery module.

In still another possible implementation, the method further includes: continuing to perform flame monitoring on the target battery module if it is not detected, within the timing duration of the timer, that a fire occurs in the target battery module, and it is detected again that a fault occurs in the target battery module.

In still another possible implementation, after detecting a fault in a target battery module, the method further includes: powering off a power loop including the target battery module.

According to a third aspect, an energy storage system is provided, including one or more power terminals, one or more battery modules, and the battery safety monitoring system according to any one of the first aspect or the implementations of the first aspect. The one or more battery modules and the one or more power terminals form a power loop, and the battery safety monitoring system is configured to perform safety monitoring on the one or more battery modules.

DETAILED DESCRIPTION OF EMBODIMENTS

The following describes embodiments with reference to accompanying drawings in embodiments.

Existing open fire detection solutions proposed in the Background are mainly applicable to fire extinguishing in wide areas and buildings. They cannot adapt to a special environment of the energy storage container and a unique nature of battery fire, and has problems such as high costs and high possibility of missed detection. The embodiments provide a battery safety monitoring solution. There is no need to deploy excessive sensors. Instead, a flame detection apparatus is controlled to perform flame monitoring on a target battery module when a fault is detected in the target battery module, to implement low-cost and accurate battery safety monitoring, and control a disaster-affected range as much as possible.

Figure 1:
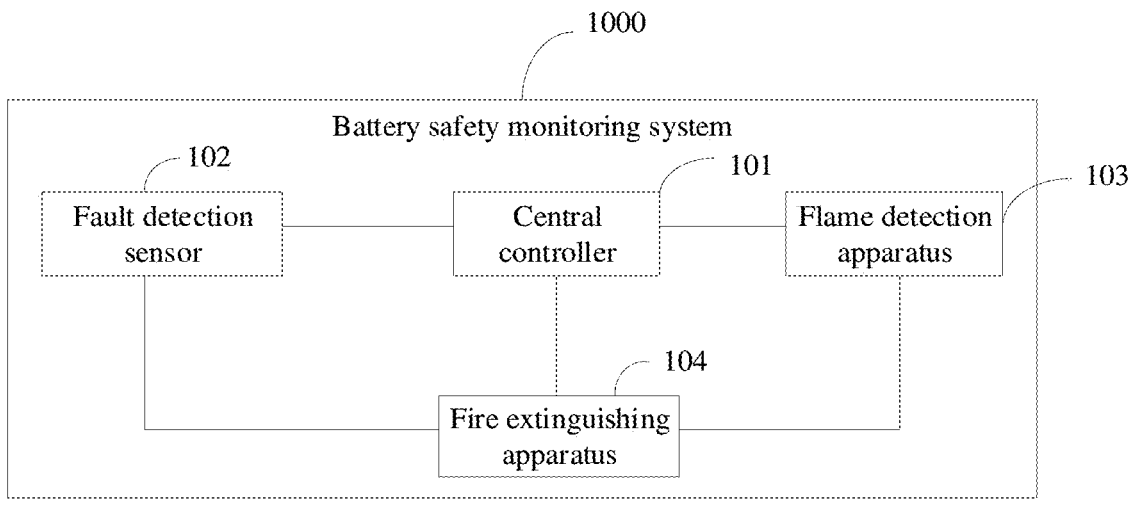
FIG. 1 is a schematic diagram of a structure of a battery safety monitoring system according to an embodiment.

FIG. 1 is a schematic diagram of a structure of a battery safety monitoring system according to an embodiment. A battery safety monitoring system 1000 is configured to perform safety monitoring on one or more battery modules. The battery safety monitoring system 1000 includes a central controller 101, a fault detection sensor 102, a flame detection apparatus 103, and a fire extinguishing apparatus 104.

The fault detection sensor 102 is configured to detect a fault in a target battery module, and send fault information to the central controller.

The central controller 101 is configured to control, based on the fault information, the flame detection apparatus 103 to perform flame detection on the target battery module.

The flame detection apparatus 103 is configured to send, when detecting a fire in the target battery module, fire information to the central controller 101.

The central controller 101 is further configured to control the fire extinguishing apparatus 104 to start a fire extinguishing operation for the target battery module.

In a possible implementation, the fault detection sensor 102 is configured to detect one or more of the following faults occurring in a cell of a battery in the target battery module: a cell temperature higher than a set temperature, a cell temperature rising speed higher than a set speed, a cell voltage lower than a set voltage, or a difference between a voltage of a cell of a first battery in a plurality of batteries included in the target battery module and a voltage of a cell of any one of the batteries, other than the first battery, in the target battery module greater than a set threshold.

In another possible implementation, the fault detection sensor 102 is configured to detect that a flammable gas concentration around the target battery module is greater than or equal to a set concentration.

In still another implementation, the flame detection apparatus 103 includes a flame detection sensor, a drive motor, and a posture adjustment base (which are not shown in the figure). The flame detection sensor is located on the posture adjustment base, and the drive motor is connected to the flame detection sensor and the posture adjustment base.

The central controller 101 is further configured to send position information of the target battery module to the drive motor.

The drive motor is configured to drive to adjust a flame monitoring angle of the posture adjustment base, so that the angle is consistent with a position of the target battery module.

The flame detection sensor is configured to continuously perform flame monitoring on the target battery module.

In still another implementation, the drive motor is further configured to periodically drive to adjust the flame monitoring angle of the posture adjustment base.

The flame detection sensor is further configured to perform flame monitoring on the one or more battery modules.

In still another possible implementation, the central controller 101 is further configured to start a timer after receiving the fault information of the target battery module.

The central controller 101 is further configured to control, within timing duration of the timer, the flame detection apparatus 103 to perform flame detection on the target battery module.

The central controller 101 is further configured to: receive, within the timing duration of the timer, the fire information sent by the flame detection apparatus 103, and control the fire extinguishing apparatus 104 to start the fire extinguishing operation for the target battery module.

In still another possible implementation, the central controller 101 is further configured to: if the fire information sent by the flame detection apparatus 103 is not received within the timing duration of the timer, and the central controller 101 receives the fault information of the target battery module again, control the flame detection apparatus 103 to continue to perform flame monitoring on the target battery module.

In still another possible implementation, the central controller 101 is further configured to power off a power loop including the target battery module.

For example, the foregoing central controller may be a central processing unit (CPU) or a micro control unit (MCU).

The central controller may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The battery safety monitoring system may further include a memory, configured to store the foregoing fault information, a program of the central controller, or the like. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

According to the battery safety monitoring system provided in this embodiment, there is no need to deploy excessive sensors. Instead, the flame detection apparatus is controlled to perform flame monitoring on the target battery module when a fault is detected in the target battery module, to implement low-cost and accurate battery safety monitoring, and control a disaster-affected range as much as possible.

Figure 2:
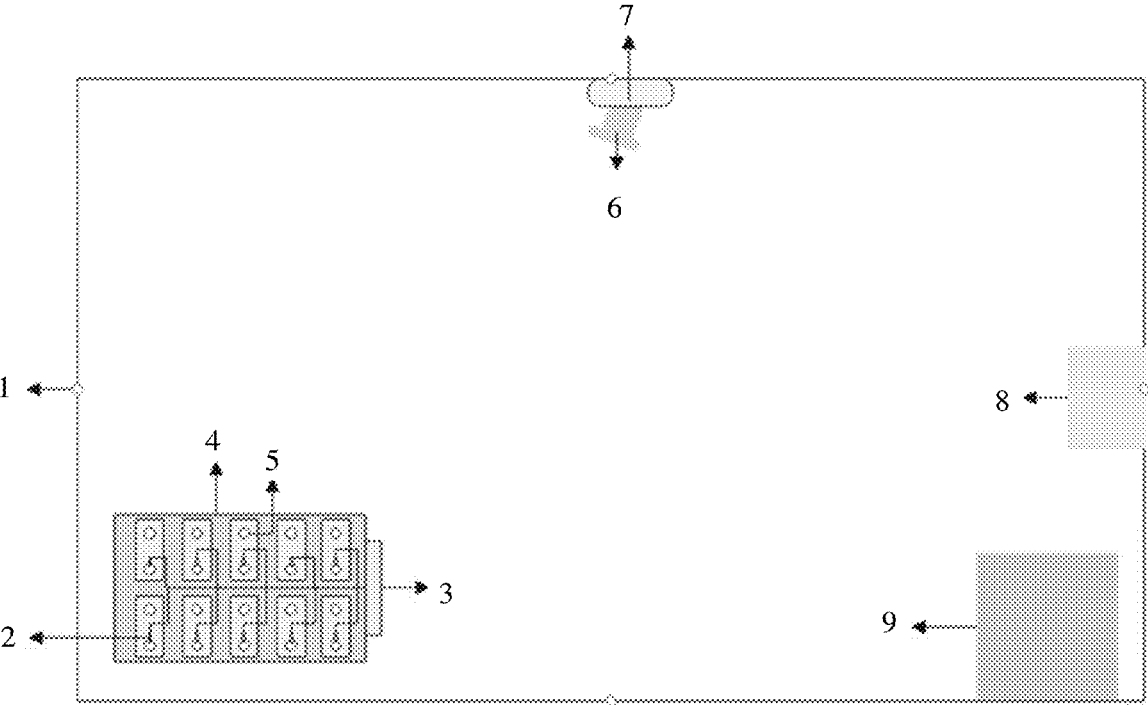
FIG. 2 is a schematic diagram of a structure of another example battery safety monitoring system according to an embodiment.

FIG. 2 is a schematic diagram a structure of another example battery safety monitoring system according to an embodiment. For example, one energy storage module 4 (for example, a battery module) is stored in a space 1 (for example, an energy storage container) used for concentrating storing battery modules. Further, the space 1 may further store more energy storage modules 4. The energy storage module 4 includes one or more batteries, and each battery has one cell 5. A fault detection sensor 2 is deployed on each energy storage module 4. All energy storage modules 4 may be subject to unified management and maintenance of a BMS 3.

A central controller 8 is deployed in the space 1, and the central controller 8 may be a CPU, an MCU, or the like. The central controller 8 is configured to perform security monitoring on one or more energy storage modules 4 stored in the space 1.

The central controller 8 is connected to the fault detection sensor 2.

A flame detection apparatus may be further deployed in the space 1. The flame detection apparatus is connected to the central controller 8. The flame detection apparatus includes a flame detection sensor 6, a drive motor (not shown in the figure), and a posture adjustment base 7. The flame detection sensor 6 is disposed on the posture adjustment base 7. The flame detection sensor may be an infrared flame sensor, an ultraviolet flame sensor, a hybrid infrared and ultraviolet flame sensor, or the like. The drive motor may drive to adjust a monitoring angle of flame detection sensor 6. For example, a monitoring angle of the flame detection sensor 6 may be 30 degrees to 180 degrees, and the flame detection sensor 6 is generally disposed at a middle top position or another open position at the top in the space 1.

A fire extinguishing apparatus 9 is further deployed in the space 1 and is configured to perform a fire extinguishing operation. The fire extinguishing apparatus 9 is connected to the central controller 8 and the flame detection apparatus, and may also be connected to the fault detection sensor 2.

For example, the central controller 8 may communicate with the BMS 3, the flame detection sensor 6, and the fire extinguishing apparatus 9 by using a controller area network (CAN), 485, fast ethernet (FE), or an optical fiber.

Before a fault in a target battery module is detected in the space 1, the monitoring angle of the flame detection sensor 6 may be periodically adjusted by using the drive motor, to perform flame monitoring on the one or more energy storage modules 4 in the space 1. In this case, the flame detection sensor 6 is disposed to a preventive maintenance inspection state. In one period, the flame detection sensor 6 performs flame monitoring on the one or more energy storage modules 4 in the space 1 in sequence. Each time of monitoring may be performed at fixed time. For example, there are 10 energy storage modules 4 in the space 1. The one or more energy storage modules 4 in the space 1 are monitored every 10 minutes. In other words, a monitoring period is 10 minutes. Then, each energy storage module 4 may be monitored for 1 minute.

When the flame detection sensor 6 is disposed to the preventive maintenance inspection state, the fire extinguishing apparatus 9 performs no operation, so that normal use of the space 1 is not affected.

When a fault is detected in the target battery module, the central controller 8 controls the flame detection sensor 6 to exit the preventive maintenance inspection state, and controls the drive motor to adjust the monitoring angle of the flame detection sensor 6, so that the monitoring angle is consistent with a position of the target battery module, that is, the flame detection sensor 6 is specially for monitoring of the target battery module.

The flame detection sensor 6 continuously performs flame monitoring on the target battery module, and determines in real time whether a flame is detected.

When a fire is detected in the target battery module, the central controller 8 controls the fire extinguishing apparatus 9 to start the fire extinguishing operation for the target battery module, which improves accuracy of the fire extinguishing operation. For example, the fire extinguishing operation includes one or more of the following: spraying a fire extinguishing agent to extinguish a fire, spraying water to extinguish a fire, spraying water spray to extinguish a fire, spraying fine water mist to extinguish a fire, or the like.

Further, the fire extinguishing apparatus 9 may also be deployed with a sensor, and the fire extinguishing operation is triggered by using the sensor, to control fire in time.

With reference to a procedure of a battery safety monitoring method, the following describes in detail how the battery safety monitoring system performs battery safety monitoring.

Figure 3:
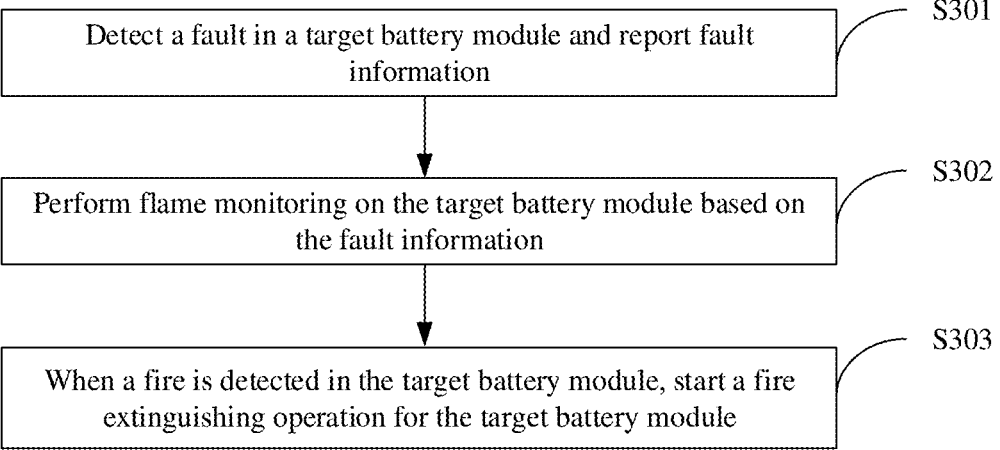
FIG. 3 is a schematic flowchart of a battery safety monitoring method according to an embodiment.

FIG. 3 is a schematic flowchart of a battery safety monitoring method according to an embodiment. For example, the method includes the following steps.

S301: Detect a fault in a target battery module and report fault information.

To save storage space or facilitate centralized management and maintenance, one or more battery packs may be stored in one space. Each battery pack may include one or more battery modules. Each battery module may further include one or more batteries. For example, space used for concentrating batteries may be an energy storage container or the like.

The battery in this embodiment may be a sodium-ion battery, a magnesium-ion battery, an aluminum battery, a potassium-ion battery, a lead-acid battery, a nickel cadmium battery, a nickel metal hydride battery, a lithium-ion battery, or the like. A battery type is not limited in this embodiment. The battery in this embodiment may also be replaced with another energy storage product.

Because of high discharge power and flammable electrolyte of the battery, there are many safety risks, including battery thermal abuse and thermal runaway. Because batteries are stored in a centralized manner, security monitoring of battery modules is very important and difficult.

One or more fault detection sensors may be deployed around each battery module or each battery in the space, and whether the one or more battery modules are faulty may be detected by using the one or more fault detection sensors.

Further, because one or more battery modules are stored in the foregoing space, to accurately perform further flame monitoring on the target battery module, when a fault is detected in the target battery module, position information of the target battery module may be further obtained.

The position information of the target battery module may be obtained by using the sensor deployed around the target battery module.

For example, the fault detection sensor configured to detect whether a fault occurs in the battery module and the sensor configured to obtain the position information of the target battery module may be a same sensor. In other words, the sensor has both a battery fault detection function and a position information obtaining function. Alternatively, the sensor configured to detect whether a fault in the battery module and the sensor configured to obtain the position information of the target battery module may be different sensors. That is, the fault detection sensor with a battery fault detection function detects whether a fault occurs in the battery module, and a sensor with a location information obtaining function obtains the location information of the target battery module.

S302: Perform flame monitoring on the target battery module based on the fault information.

After a fault is detected in the target battery module, the central controller may further monitor whether the target battery module may cause a fire. For example, the central controller may control, based on the position information of the target battery module, the flame detection apparatus to perform flame monitoring on the target battery module, so as to improve accuracy of flame monitoring.

S303: When a fire is detected in the target battery module, start a fire extinguishing operation for the target battery module.

When detecting a fire in the target battery module, the flame detection apparatus reports fire information to the central controller, and the central controller controls the fire extinguishing apparatus to start the fire extinguishing operation for the target battery module, which improves accuracy of the fire extinguishing operation.

For example, the fire extinguishing operation includes one or more of the following: spraying a fire extinguishing agent to extinguish a fire, spraying water to extinguish a fire, spraying water spray to extinguish a fire, spraying fine water mist to extinguish a fire, or the like, used for fire extinguishing and cooling.

According to the battery safety monitoring method provided in this embodiment, there is no need to deploy excessive sensors. Instead, the flame detection apparatus is controlled to perform flame monitoring on the target battery module when a fault is detected in the target battery module, to implement low-cost and accurate battery safety monitoring.

Figure 4:
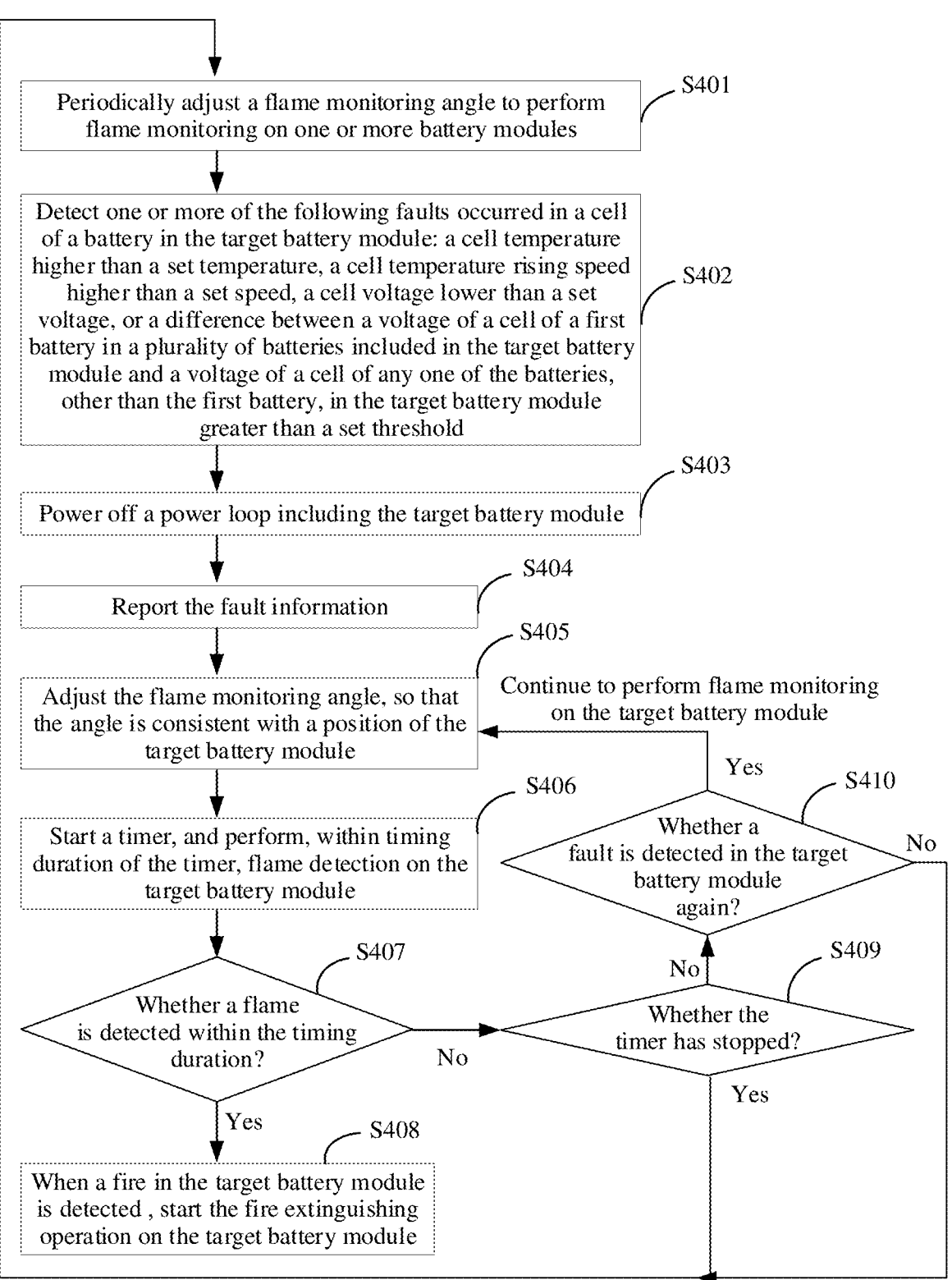
FIG. 4 is a flowchart of another battery safety monitoring method according to an embodiment.

FIG. 4 is a schematic flowchart of another battery safety monitoring method according to an embodiment. For example, the method includes the following steps.

S401: Periodically adjust a flame monitoring angle to perform flame monitoring on one or more battery modules.

When a fault detection sensor detects no fault in a target battery module, a central controller may control a flame detection apparatus to periodically adjust the monitoring angle to perform flame monitoring on the one or more battery modules in a space.

According to the battery safety monitoring system shown in FIG. 2, for example, one energy storage module 4 (for example, a battery module) is stored in the space 1 (for example, an energy storage container) used for concentrating battery modules. Also, the space 1 may further store more energy storage modules 4. The energy storage module 4 includes one or more batteries, and each battery has one cell 5. A fault detection sensor 2 is deployed on each energy storage module 4. All energy storage modules 4 may be subject to unified management and maintenance of a BMS 3.

A central controller 8 is deployed in the space 1, and the central controller 8 may be a CPU, an MCU, or the like. The central controller 8 is configured to perform security monitoring on one or more energy storage modules 4 stored in the space 1.

The central controller 8 is connected to the fault detection sensor 2.

A flame detection apparatus may be further deployed in the space 1. The flame detection apparatus is connected to the central controller 8. The flame detection apparatus includes a flame detection sensor 6, a drive motor (not shown in the figure), and a posture adjustment base 7. The flame detection sensor 6 is disposed on the posture adjustment base 7. The flame detection sensor may be an infrared flame sensor, an ultraviolet flame sensor, a hybrid infrared and ultraviolet flame sensor, or the like. The drive motor may drive to adjust a monitoring angle of flame detection sensor 6. For example, the monitoring angle of the flame detection sensor 6 may be 30 degrees to 180 degrees, and the flame detection sensor 6 is generally disposed at a middle top position or another open position at the top in the space 1.

A fire extinguishing apparatus 9 is further deployed in the space 1 and is configured to perform a fire extinguishing operation. The fire extinguishing apparatus 9 is connected to the central controller 8 and the flame detection apparatus, and may also be connected to the fault detection sensor 2.

Before a fault is detected in the target battery module in the space 1, the monitoring angle of the flame detection sensor 6 may be periodically adjusted by using the drive motor, to perform flame monitoring on the one or more energy storage modules 4 in the space 1. In this case, the flame detection sensor 6 is disposed to a preventive maintenance inspection state. In one period, the flame detection sensor 6 performs flame monitoring on the one or more energy storage modules 4 in the space 1 in sequence. Each time of monitoring may be performed at fixed time. For example, there are 10 energy storage modules 4 in the space 1. The one or more energy storage modules 4 in the space 1 are monitored every 10 minutes. In other words, a monitoring period is 10 minutes. Then, each energy storage module 4 may be monitored for 1 minute.

When the flame detection sensor 6 is disposed to the preventive maintenance inspection state, the fire extinguishing apparatus 9 performs no operation, so that the normal use of the space 1 is not affected.

S402: Detect one or more of the following faults occurring in a cell of a battery in the target battery module: a cell temperature higher than a set temperature, a cell temperature rising speed higher than a set speed, a cell voltage lower than a set voltage, or a difference between a voltage of a cell of a first battery in a plurality of batteries included in the target battery module and a voltage of a cell of any one of the batteries, other than the first battery, in the target battery module greater than a set threshold.

The fault detection sensor detects a fault in the target battery module. For example, the fault detection sensor may detect one or more of the following faults occurring in the cell in the target battery module: overtemperature of the cell (for example, a temperature of the cell higher than a set temperature), a rapid temperature rise of the cell (for example, a temperature rising speed of the cell higher than a set speed), a voltage drop (for example, a voltage of the cell is lower than a set voltage), or voltage outlier (for example, a difference between a voltage of a cell of a first battery in a plurality of batteries included in the target battery module and a voltage of a cell of any of the batteries, other than the first battery, in the target battery module is greater than a set threshold). In this case, it may be considered that a fault occurs in the target battery module.

The fault detection sensor 2 in FIG. 2 may detect one or more of the foregoing faults. For example, a temperature sensor may be configured to detect a fault, for example, overtemperature of the cell or a rapid temperature rise of the cell; and/or a voltage sensor may be configured to detect a fault, for example, a voltage drop or voltage outlier.

As shown in FIG. 2, after detecting one or more of the foregoing faults, the fault detection sensor 2 may report the fault to the BMS 3, and then the BMS 3 reports the fault to the central controller 8.

S403: Power off a power loop including the target battery module.

After one or more of the foregoing faults occurring in the cell in the target battery module are detected, the power loop including the target battery module may be first powered off.

Powering off the power loop including the target battery module in a timely manner can avoid a fire in the power loop, and prevent the target battery module from damaging a component in the power loop and causing a greater loss.

S404: Report fault information.

The fault information may include detailed information about one or more detected faults, or may be only used to indicate that a fault occurs in the target battery module.

Generally, one or more battery modules are stored in the space. To further accurately perform flame monitoring on the target battery module, when a fault in the target battery module is detected, position information of the target battery module may be further obtained, so that when there is a fire in the space for storing the battery, quick detection and response can be implemented, and fire information can be reported and a fire extinguishing operation can be performed as early as possible, to control a disaster-affected range as much as possible. As shown in FIG. 2, a position sensor may be further disposed on the energy storage module 4, and may be configured to obtain the position information of a target energy storage module 4. After receiving the information that is reported by the BMS 3 and that indicates that a fault occurs in the energy storage module 4, the central controller 8 may indicate the position sensor to report the position information of the target energy storage module 4. Therefore, the fault information may further include the position information of the target battery module.

S405: Adjust the flame monitoring angle, so that the angle is consistent with a position of the target battery module.

After a fault is detected in the target battery module, the flame detection sensor 6 is controlled to exit the preventive maintenance inspection state, and the drive motor is controlled to adjust the flame monitoring angle of the flame detection sensor 6, so that the angle is consistent with the position of the target battery module, that is, the flame detection sensor 6 is specially for monitoring of the target battery module.

S406: Start a timer, and perform, within timing duration of the timer, flame detection on the target battery module.

When a fault is detected in the target battery module, the flame monitoring is continuously performed on the target battery module, to monitor whether the target battery module will be on fire.

S407: Determine whether a flame is detected within the timing duration. If yes, step S408 is performed; otherwise, step S409 is performed.

The flame detection sensor 6 continuously performs flame monitoring on the target battery module, and determines in real time whether a flame is detected.

S408: When a fire is detected in the target battery module, start the fire extinguishing operation for the target battery module.

When a fire in the target battery module is detected, the central controller 8 controls the fire extinguishing apparatus 9 to start the fire extinguishing operation for the target battery module, and accuracy of the fire extinguishing operation is improved. For example, the fire extinguishing operation includes one or more of the following: spraying a fire extinguishing agent to extinguish a fire, spraying water to extinguish a fire, spraying water spray to extinguish a fire, spraying fine water mist to extinguish a fire, or the like.

Further, the fire extinguishing apparatus 9 may also be deployed with a sensor, and the fire extinguishing operation is triggered by using the sensor, to control fire in time.

S409: When no fire is detected in the target battery module, determine whether the timer has stopped. If yes, step S401 is performed; otherwise, step S410 is performed.

If no fire is detected in the target battery module, and the timer is still counting, the monitoring continues.

S410: Determine whether a fault is detected in the target battery module again. If yes, step S405 is performed to continue to perform flame monitoring on the target battery module; otherwise, step S401 is performed.

If no fire is detected in the target battery module within timing duration of the timer, the central controller 8 determines, based on the fault information reported by the fault detection sensor 2 in real time by using the BMS 3, whether a fault warning is cleared, in other words, whether a fault is detected in the target battery module again. If the warning is cleared, the monitoring angle of the flame detection sensor 6 is adjusted, so that the flame detection sensor 6 enters the preventive maintenance inspection state, and continues to periodically perform flame monitoring. If the warning is not cleared, flame monitoring continues to be performed on the target battery module.

According to the battery safety monitoring method provided in this embodiment, there is no need to deploy excessive sensors. Instead, the flame detection apparatus is controlled to perform flame monitoring on the target battery module when detecting the fault information, for example, the overtemperature, the rapid temperature rise, the voltage drop, or the voltage outlier of the cell in a battery in the target battery module, to implement low-cost and accurate battery safety monitoring. In this way, quick detection and response can be implemented, and the fire information can be reported and the fire extinguishing operation can be performed as early as possible, to control a disaster-affected range as much as possible.

Figure 5:
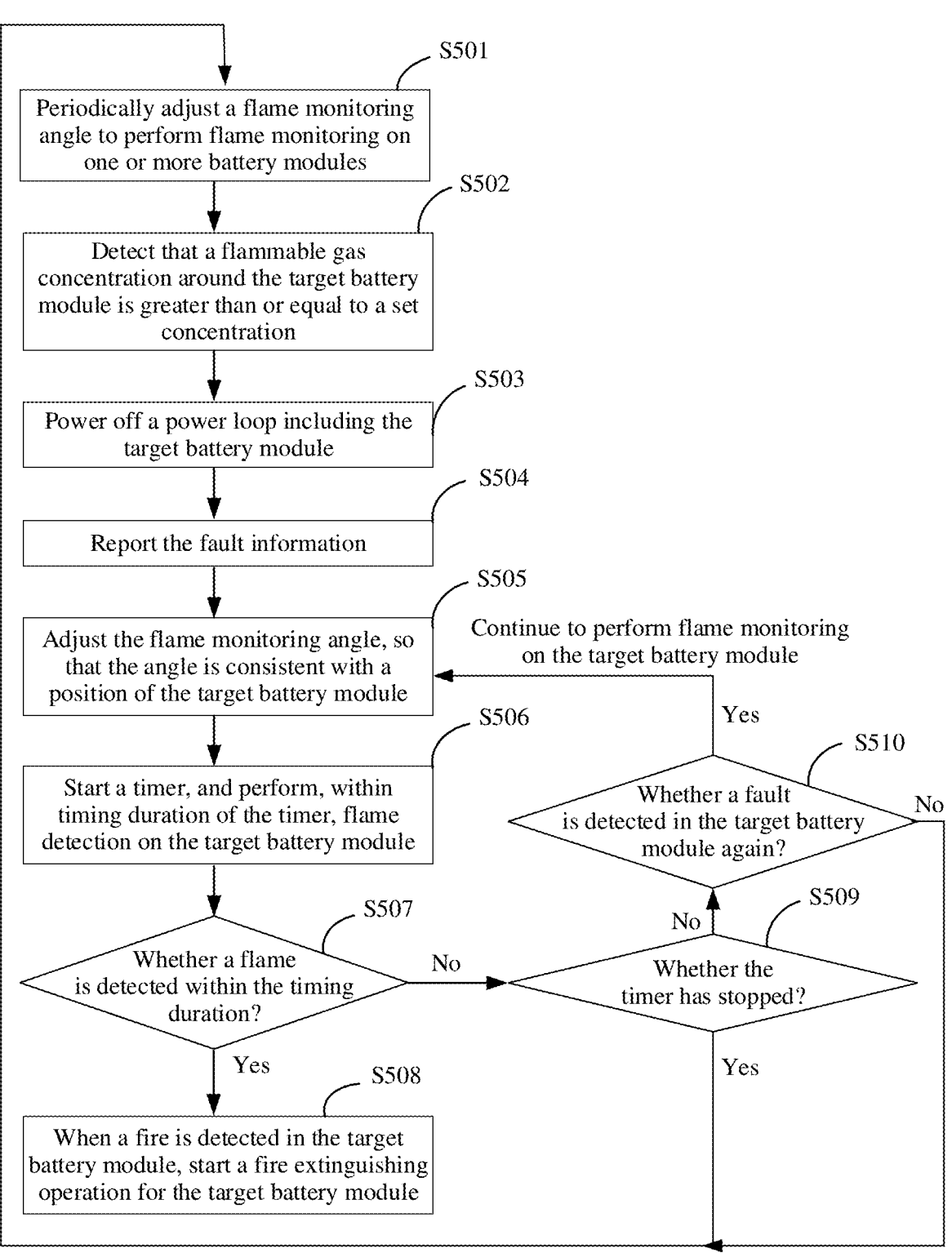
FIG. 5 is a schematic flowchart of still another battery safety monitoring method according to an embodiment.

FIG. 5 is a schematic flowchart of still another battery safety monitoring method according to an embodiment. For example, the method includes the following steps.

S501: Periodically adjust a flame monitoring angle to perform flame monitoring on one or more battery modules.

For specific implementation of this step, refer to step S401 in the embodiment shown in FIG. 4. Details are not described herein again.

S502: Detect that a flammable gas concentration around the target battery module is greater than or equal to a set concentration.

When a fault is detected in the target battery module, a valve of a cell of one or more batteries in the target battery module may be opened, and a small amount of flammable gas is generated. The flammable gas includes hydrogen, carbon monoxide, volatile organic compound, or the like.

When duration in which the valve of the cell of the one or more batteries in the target battery module is open is long, or a quantity of cells in the target battery module whose valves are open is large, the flammable gas concentration may be increasingly large. In this embodiment, a fault detection sensor may be a flammable gas sensor. For example, the flammable gas concentration around the target battery module may be detected by using one or more flammable gas sensors of hydrogen, carbon monoxide, volatile organic compound, or the like.

The flammable gas sensor may be deployed on each battery module or each battery in the battery module. The central controller 8 in FIG. 2 may communicate with a BMS 5, the flammable gas detection sensor, and the fire extinguishing apparatus 9 by using a CAN, 485, FE, or optical fiber.

When the flammable gas sensor detects that the flammable gas concentration around the target battery module is greater than or equal to the set concentration, the flammable gas sensor may send fault information to the BMS 5, and the BMS 5 reports the fault information to the central controller 8. The set concentration may be set based on an empirical value, or may be obtained in another manner.

S503: Power off a power loop including the target battery module.

For specific implementation of this step, refer to step S403 in the embodiment shown in FIG. 4. Details are not described herein again.

S504: Report the fault information.

For specific implementation of this step, refer to step S404 in the embodiment shown in FIG. 4. Details are not described herein again.

S505: Adjust the flame monitoring angle, so that the angle is consistent with a position of the target battery module.

For specific implementation of this step, refer to step S405 in the embodiment shown in FIG. 4. Details are not described herein again.

S506: Start a timer and perform, within timing duration of the timer, flame detection on the target battery module.

For specific implementation of this step, refer to step S406 in the embodiment shown in FIG. 4. Details are not described herein again.

S507: Determine whether a flame is detected within the timing duration. If yes, step S508 is performed; otherwise, step S509 is performed.

For specific implementation of this step, refer to step S407 in the embodiment shown in FIG. 4. Details are not described herein again.

S508: When a fire is detected in the target battery module, start a fire extinguishing operation for the target battery module.

For specific implementation of this step, refer to step S408 in the embodiment shown in FIG. 4. Details are not described herein again.

S509: When no fire is detected in the target battery module, determine whether the timer has stopped. If yes, step S501 is performed; otherwise, step S510 is performed.

For specific implementation of this step, refer to step S409 in the embodiment shown in FIG. 4. Details are not described herein again.

S510: Determine whether a fault is detected in the target battery module again. If yes, step S505 is performed to continue to perform flame monitoring on the target battery module; otherwise, step S501 is performed.

For specific implementation of this step, refer to step S410 in the embodiment shown in FIG. 4. Details are not described herein again.

According to the battery safety monitoring method provided in this embodiment, there is no need to deploy excessive sensors. Instead, the flame detection apparatus is controlled to perform flame monitoring on the target battery module when detecting that the flammable gas concentration around the target battery module is greater than or equal to the set concentration, to implement low-cost and accurate battery safety monitoring. In this way, the quick detection and response can be implemented, and the fire information can be reported and the fire extinguishing operation can be performed as early as possible, to control a disaster-affected range as much as possible.

An embodiment further provides an energy storage system, including one or more power terminals, one or more battery modules, and the foregoing battery safety monitoring system. The one or more battery modules and the one or more power terminals form a power loop, and the battery safety monitoring system is configured to perform safety monitoring on the one or more battery modules.

It should be understood that unless otherwise specified, "/" indicates an "or" relationship between associated objects. For example, A/B may indicate A or B. A and B may be singular or plural. In addition, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the solutions in embodiments, terms such as "first" and "second" are used in embodiments to distinguish between same items or similar items that provide basically same functions or purposes. A person skilled in the art may understand that the terms such as "first" and "second" do not limit a quantity and an execution sequence, and the terms such as "first" and "second" do not indicate a definite difference. In addition, in embodiments, the word such as "example" or "for example" is used to represent giving an example, an illustration, or a description. Any embodiment or design scheme described as an "example" or "for example" in embodiments should not be explained as being more preferred or having more advantages than another embodiment or design scheme. Exactly, use of the word such as "example" or "for example" is intended to present a relative concept in a specific manner for ease of understanding.

All or some of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedures or functions according to embodiments are all or partially generated. The computer may be a general-purpose computer, a dedicated computer, a computer network, or another programmable apparatus. The computer instructions may be stored in a non-transitory computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, SSD), or the like.

Although described with reference to embodiments, in a process of implementing the embodiments, a person skilled in the art may understand and implement another variation of the embodiments by viewing the accompanying drawings and associated content. A single processor or another unit may implement several functions enumerated in the embodiments.

The invention claimed is:

1. A battery safety monitoring system, wherein the battery safety monitoring system is configured to perform safety monitoring on one or more battery modules, and the battery safety monitoring system comprises:

a fault detection sensor configured to detect a fault in a target battery module, and send fault information to a central controller;

the central controller configured to control, based on the fault information, the flame detection apparatus to perform flame detection on the target battery module;

a flame detection apparatus configured to send, when detecting a fire in the target battery module, fire information to the central controller;

wherein the flame detection apparatus comprises a flame detection sensor, a drive motor, and a posture adjustment base;

a fire extinguishing apparatus;

wherein the central controller is further configured to control the fire extinguishing apparatus to start a fire extinguishing operation for the target battery module; and wherein the flame detection sensor is located on the posture adjustment base, and the drive motor is connected to the flame detection sensor and the posture adjustment base;

the central controller is further configured to send position information of the target battery module to the drive motor;

the drive motor is configured to drive to adjust a flame monitoring angle of the posture adjustment base, so that the angle is consistent with a position of the target battery module; and the flame detection sensor is configured to continuously perform flame monitoring on the target battery module.

2. The system according to claim 1, wherein the fault detection sensor is configured to detect one or more faults occurring in a cell of a battery in the target battery module, and the one or more faults comprise: a cell temperature higher than a set temperature, a cell temperature rising speed higher than a set speed, a cell voltage lower than a set voltage, or a difference between a voltage of a cell of a first battery in a plurality of batteries comprised in the target battery module and a voltage of a cell of any one of the batteries, other than the first battery, in the target battery module greater than a set threshold.

3. The system according to claim 1, wherein the fault detection sensor is configured to detect that a flammable gas concentration around the target battery module is greater than or equal to a set concentration.

4. The system according to claim 1, wherein the central controller is further configured to start a timer after receiving the fault information of the target battery module;

the central controller is further configured to control, within a timing duration of the timer, the flame detection apparatus to perform flame detection on the target battery module; and the central controller is further configured to: receive, within the timing duration of the timer, the fire information sent by the flame detection apparatus, and control the fire extinguishing apparatus to start the fire extinguishing operation for the target battery module.

5. The system according to claim 4, wherein the central controller is further configured to: if the fire information sent by the flame detection apparatus is not received within the timing duration of the timer, and the central controller receives the fault information of the target battery module again, control the flame detection apparatus to continue to perform flame monitoring on the target battery module.

6. The system according to claim 1, wherein the drive motor is further configured to periodically drive to adjust the flame monitoring angle of the posture adjustment base; and the flame detection sensor is further configured to perform flame monitoring on the one or more battery modules.

7. The system according to claim 6, wherein the central controller is further configured to start a timer after receiving the fault information of the target battery module;

the central controller is further configured to control, within a timing duration of the timer, the flame detection apparatus to perform flame detection on the target battery module; and the central controller is further configured to: receive, within the timing duration of the timer, the fire information sent by the flame detection apparatus, and control the fire extinguishing apparatus to start the fire extinguishing operation for the target battery module.

8. The system according to claim 7, wherein the central controller is further configured to: if the fire information sent by the flame detection apparatus is not received within the timing duration of the timer, and the central controller receives the fault information of the target battery module again, control the flame detection apparatus to continue to perform flame monitoring on the target battery module.

9. A battery safety monitoring method, comprising:

detecting a fault in a target battery module and reporting fault information;

performing flame monitoring on the target battery module based on the fault information;

wherein during the flame monitoring adjust a flame monitoring angle so that the flame monitoring angle is consistent with a position of the target battery module and periodically adjusting the flame monitoring angle;

when detecting a fire in the target battery module, starting a fire extinguishing operation for the target battery module; and wherein continuously performing the flame monitoring on the target battery module comprises:

when a fault is detected in the target battery module, starting a timer; and performing, within timing duration of the timer, flame detection on the target battery module; and starting the fire extinguishing operation for the target battery module comprises:

when detecting a fire in the target battery module within the timing duration of the timer, starting a fire extinguishing operation for the target battery module.

10. The method according to claim 9, wherein detecting the fault in a target battery module comprises:

detecting one or more of faults occurring in a cell of a battery in the target battery module, wherein the one or more faults comprise: a cell temperature higher than a set temperature, a cell temperature rising speed higher than a set speed, a cell voltage lower than a set voltage, or a difference between a voltage of a cell of a first battery in a plurality of batteries comprised in the target battery module and a voltage of a cell of any one of the batteries, other than the first battery, in the target battery module greater than a set threshold.

11. The method according to claim 9, wherein detecting the fault in the target battery module comprises:

detecting that a flammable gas concentration around the target battery module is greater than or equal to a set concentration.

12. The method according to claim 9, wherein performing the flame monitoring on the target battery module comprises:

continuously performing flame monitoring on the target battery module.

13. The method according to claim 12, wherein before detecting the fault in a target battery module, the method further comprises:

periodically adjusting the flame monitoring angle; and performing flame monitoring on the one of the plurality of batteries comprised in the target battery modules.

14. The method according to claim 13, wherein continuously performing the flame monitoring on the target battery module comprises:

when a fault is detected in the target battery module, starting a timer; and performing, within timing duration of the timer, flame detection on the target battery module; and starting the fire extinguishing operation for the target battery module comprises:

when detecting a fire in the target battery module within the timing duration of the timer, starting a fire extinguishing operation for the target battery module.

15. The method according to claim 14, further comprising:

continuing to perform flame monitoring on the target battery module if it is not detected, within the timing duration of the timer, that a fire occurs in the target battery module, and it is detected again that a fault occurs in the target battery module.

16. The method according to claim 15, wherein after detecting the fault in a target battery module, the method further comprises:

powering off a power loop comprising the target battery module.

17. The method according to claim 9, further comprising:

continuing to perform flame monitoring on the target battery module if it is not detected, within the timing duration of the timer, that a fire occurs in the target battery module, and it is detected again that a fault occurs in the target battery module.

18. An energy storage system, comprising one or more power terminals;

one or more battery modules;

a battery safety monitoring system configured to perform safety monitoring on one or more battery modules, and the battery safety monitoring system comprises:

a fault detection sensor configured to detect a fault in a target battery module, and send fault information to a central controller;

the central controller configured to control, based on the fault information, the flame detection apparatus to perform flame detection on the target battery module;

a flame detection apparatus configured to send, when detecting a fire in the target battery module, fire information to the central controller;

wherein the flame detection apparatus comprises a flame detection sensor, a drive motor, and a posture adjustment base; and a fire extinguishing apparatus;

wherein the central controller is further configured to control the fire extinguishing apparatus to start a fire extinguishing operation for the target battery module;

the one or more battery modules and the one or more power terminals form a power loop, and the battery safety monitoring system is configured to perform safety monitoring on the one or more battery modules without performing the fire extinguishing operation; and wherein the flame detection sensor is located on the posture adjustment base, and the drive motor is connected to the flame detection sensor and the posture adjustment base;

the central controller is further configured to send position information of the target battery module to the drive motor;

the drive motor is configured to drive to adjust a flame monitoring angle of the posture adjustment base, so that the angle is consistent with a position of the target battery module; and the flame detection sensor is configured to continuously perform flame monitoring on the target battery module.

19. The energy storage system according to claim 18, wherein the central controller is further configured to start a timer after receiving the fault information of the target battery module;

the central controller is further configured to control, within a timing duration of the timer, the flame detection apparatus to perform flame detection on the target battery module; and the central controller is further configured to: receive, within the timing duration of the timer, the fire information sent by the flame detection apparatus, and control the fire extinguishing apparatus to start the fire extinguishing operation for the target battery module.

20. The energy storage system according to claim 19, wherein the central controller is further configured to: if the fire information sent by the flame detection apparatus is not received within the timing duration of the timer, and the central controller receives the fault information of the target battery module again, control the flame detection apparatus to continue to perform flame monitoring on the target battery module.

* * * * *